United States Patent [19]

Furukawa

[11] Patent Number: 5,435,055
[45] Date of Patent: * Jul. 25, 1995

[54] METHOD OF MANUFACTURING A SEALED ALKALINE STORAGE BATTERY USING POSITIVE PASTE NICKEL ELECTRODES

[75] Inventor: Jun Furukawa, Iwaki, Japan

[73] Assignee: Furukawa Denchi Kabushiki Kaisha, Japan

[*] Notice: The portion of the term of this patent subsequent to Jun. 21, 2011 has been disclaimed.

[21] Appl. No.: 162,773

[22] Filed: Dec. 8, 1993

[30] Foreign Application Priority Data

Dec. 10, 1992 [JP] Japan ................................. 4-352724

[51] Int. Cl.⁶ ............................................. H01M 6/00
[52] U.S. Cl. .................................. 29/623.5; 29/623.1; 29/623.2; 429/217; 429/218; 429/223
[58] Field of Search ....................... 429/217, 218, 223; 29/623.1, 623.2, 623.5

[56] References Cited

U.S. PATENT DOCUMENTS 4,935,318 6/1990 Ikoma et al. .......................... 429/206
5,322,527 6/1994 Furukawa ............................ 29/623.5

*Primary Examiner*—Prince Willis, Jr.
*Assistant Examiner*—M. Nuzzolillo
*Attorney, Agent, or Firm*—Breiner & Breiner

[57] ABSTRACT

A method of making a sealed alkaline storage battery including a positive paste nickel electrode containing cobalt and/or cobalt oxide and a negative electrode stacked upon the positive electrode with a separator interposed therebetween in a battery container which is sealed within about one hour after pouring an alkaline electrolyte into the container. An initial charging of the sealed battery is provided within about 10 hours after the completion of the pouring of the electrolyte to provide an initial ampere-hour charge to the battery of about 5% or more of the battery's rated capacity. This method avoids formation of $HCoO_2^-$ ions which cause short-circuiting of the battery.

2 Claims, No Drawings

METHOD OF MANUFACTURING A SEALED ALKALINE STORAGE BATTERY USING POSITIVE PASTE NICKEL ELECTRODES

FIELD OF THE INVENTION

This invention relates to a method of manufacturing a sealed alkaline storage battery using a positive paste nickel electrode.

BACKGROUND OF THE INVENTION

In comparing a conventional sealed alkaline storage battery using a sintered positive nickel electrode and a conventional sealed alkaline storage battery using a positive paste nickel electrode, the paste electrode is preferred since it is considered capable of providing a higher capacity.

A sealed alkaline storage battery using a paste nickel electrode is generally manufactured as follows. A nickel hydroxide powder is mixed with Co (cobalt), CoO (cobalt oxide), Ni (nickel) and/or other powder(s). These components serve as the electroconductive material which increase electroconductivity and minimize polarization. The resultant mixture is combined with an aqueous solution of a thickener, such as carboxymethylcellulose (CMC), and is kneaded to form a paste. The paste is then applied to a porous metal base plate or substrate, such as a foam nickel substrate, a fibrous nickel felt substrate or the like, in a manner so that the paste fills in the pores of the substrate. The pasted substrate is then dried and roll-pressed to produce a paste nickel electrode. This nickel electrode substrate is then used as a positive electrode for a battery. The positive electrode is paired with a negative electrode with a separator interposed between the positive and negative electrodes to make a battery element. The battery element is inserted into a battery container. Thereafter, an electrolyte is poured into the container and the container sealed to make a sealed alkaline storage battery which is useful in various fields. However, it has been observed that in the course of this storage battery manufacturing process, Co or CoO contained in the positive electrode dissolves in the alkaline electrolyte and, thereafter, deposits on the separator which can cause a short-circuiting of the battery.

Precisely how this short-circuiting of the battery occurs has not yet been fully determined, however, it is believed to occur when Co powder is oxidized by the oxygen in the atmosphere to form CoO which when brought into contact with the alkaline electrolyte forms $HCoO_2^-$ ions. The chemical reactions of Co in the presence of oxygen and alkaline electrolyte is as follows: $Co \rightarrow CoO \rightarrow HCoO_2^- \rightarrow Co_3O_4$. The $Co_3O_4$ is deposited on and in the separator as brown specks which cause the short-circuiting of the battery. Even when sealed off from air, the chemical reaction of $CoO \rightarrow HCoO_2^-$ nonetheless continues. In this event, although the diffusion of the ions in the electrolyte is relatively slow, they eventually pass through the separator to reach the negative electrode and, thereafter, during the charging operation, they then become reduced to Co to cause short-circuiting of the battery. Similar reactions also take place in the case of added CoO powder.

Accordingly, regardless of the presence or absence of oxygen, the dissolution of CoO in the alkaline electrolyte to $HCoO_2^-$ goes on continuously. If oxygen from the atmosphere is present, $Co_3O_4$ is deposited on the separator causing the short-circuiting of the battery. Additionally, $HCoO_2^-$ ions pass through the separator to reach the negative electrode and, at the time of the charging operation, are reduced and cause short-circuiting of the battery.

OBJECTS AND BRIEF DESCRIPTION OF THE INVENTION

The present invention solves the above-mentioned short-circuiting problems by providing a method of manufacturing a sealed alkaline storage battery using a positive paste nickel electrode which is characterized by a paste nickel electrode containing Co and/or CoO as the positive electrode in a battery element formed by stacking the positive electrode and a negative electrode one upon another with a separator interposed therebetween in a battery container, wherein (1) an alkaline electrolyte is poured into the battery container and the battery container is sealed within about one hour after completion of the electrolyte pouring, (2) an initial charging of the sealed battery is started within about 10 hours after completion of the electrolyte pouring and (3) continuing the initial charging to provide the battery with a charged ampere-hour which is at least about 5% or more of the battery's rated capacity.

When the battery container is sealed within about one hour after completion of the pouring of the alkaline electrolyte into the battery container so as to seal or shut off the interior of the battery container from the ambient air, the progress of the chemical reactions of $Co \rightarrow CoO \rightarrow HCoO_2^- \rightarrow Co_3O_4$ or of $Co \rightarrow HCoO_2^- \rightarrow Co_3O_4$ is prevented. Therefore, the short-circuiting of the battery due to deposition of $Co_3O_4$ on the separator is also prevented. When the initial charging of the sealed battery is started within about 10 hours after the completion of the alkaline electrolyte pouring and is carried out to provide the sealed battery with a charged ampere-hour which is about 5% or more of its rated capacity, Co or CoO is changed to CoOOH, which is a stable oxide with a low solubility. The formation of $HCoO_2^-$ ions, therefore, which can reach the negative electrode and cause short-circuiting of the battery is prevented.

DETAILED DESCRIPTION AND PRESENTLY PREFERRED EMBODIMENTS

Presently preferred embodiments of the invention are described in detail below.

Ten grams of a commercially available nickel powder as sold under the tradename INCO #255 by INCO Limited and 5 grams of a Co powder as commercially sold by UN Extra Fine Co. were mixed together. Eighty-five grams of a spherical nickel hydroxide powder containing about 1% of Co was added to the mixture and the components well mixed together. Thirty-five grams of a 2% aqueous solution of carboxymethylcellulose (CMC) was added to the mixture thus obtained and kneaded to provide a paste. A foam nickel plate or substrate was then coated and the pores therein filled with the paste in a conventional manner and dried. Further, the pasted substrate was impregnated with a 5% PTFE disperse liquid, dried, and roll-pressed to a predetermined thickness to provide a paste nickel electrode plate. The electrode plate made in this manner was referred to as Positive Electrode A.

In addition to Positive Electrode A, another paste nickel electrode paste was manufactured as follows.

Ten grams of the above-mentioned commercially available Ni powder INCO #255, 5 grams of a commercially available Co powder sold under the tradename FCO-178 by Sumitomo Metal Mining Co. and 85 grams of a spherical nickel hydroxide were mixed together. Thereafter, the same subsequent manufacturing steps as described above with respect to the manufacture of Positive Electrode A were carried out using the resultant mixture so that another paste nickel electrode was manufactured. The electrode plate made in this manner was referred to as Positive Electrode B.

Next, battery elements were assembled as follows using each of the paste nickel Positive Electrodes A and B, respectively. Namely, each battery element was made by stacking one upon another in a laminate fashion Positive Electrode A or B and a negative electrode made of a hydrogen-occlusion alloy, with a separator interposed between the positive and negative electrodes. The stacked electrodes and separator were then rolled into a spiral form. The resultant spiral battery element was inserted into a cylindrical battery container and an alkaline electrolyte solution having a specific gravity of 1.36 was poured into the battery container. The battery container was then sealed by a conventional process and means. In this manner, a plurality of sealed nickel-hydrogen batteries having a rated capacity of 1100 milliampere hour (mAh) were manufactured.

In the test samples, different variations as set forth below were made in the batteries. First, in order to investigate the relationship between the lapse of time between the completion of the electrolyte pouring and the sealing of the battery container and the occurrence of the short-circuiting of the battery, differing test samples of the above-mentioned sealed batteries were manufactured by varying the lapse of time which occurred in the different test batteries and examining the rate of occurrence of the battery short-circuiting. Second, test batteries were provided having different lapses of time between the completion of the electrolyte pouring and the starting of the initial charging. The rate of occurrence of the battery short-circuiting was also then examined for these test batteries. Third, when the initial charging was provided to the various sealed test batteries, the charged ampere-hour based on the rated capacity provided to the test batteries was varied and the occurrence rate of battery short-circuiting examined.

After allowing the test batteries to stand for 16 hours following the initial charging, the test batteries were charged at an ambient temperature of 20° C. with 0.2 Coulomb(C) current for 7.5 hours and were then discharged with the same 0.2 C current as above to a final battery voltage of 1.0 Volt(V). This charge-discharge operation was repeated twice and the batteries were left at 40° C. for 24 hours in order to carry out the initial activation. Then, for the purpose of investigating the rate or percentage of the battery short-circuiting, one cycle of the charge-discharge operation under the same conditions as above was provided to the test batteries. The batteries were then left in a discharged state for 7 days at an ambient temperature of 40° C., and the voltage of each battery was then measured. Any battery having a battery voltage of less than 1.1 V was taken as having short-circuited. The test results showing the relationship between each of the above-described three conditions and the rate of occurrence of the short-circuiting of the batteries are set forth in Tables 1, 2 and 3 below.

TABLE 1

| LAPSE OF TIME FROM COMPLETION OF ELECTROLYTE POURING TO SEAL (Hr.) | RATE OF OCCURRENCE OF SHORT-CIRCUITED BATTERY USING POSITIVE ELECTRODE A (%) | RATE OF OCCURRENCE OF SHORT-CIRCUITED BATTERY USING POSITIVE ELECTRODE B (%) |
| --- | --- | --- |
| 0.5 | 0 | 0 |
| 1.0 | 0 | 0 |
| 2.0 | 2 | 5 |

TABLE 2

| LAPSE OF TIME FROM COMPLETION OF ELECTROLYTE POURING TO START OF INITIAL CHARGING (Hr.) | RATE OF OCCURRENCE OF SHORT-CIRCUITED BATTERY USING POSITIVE ELECTRODE A* (%) | RATE OF OCCURRENCE OF SHORT-CIRCUITED BATTERY USING POSITIVE ELECTRODE B* (%) |
| --- | --- | --- |
| 1.0 | 0 | 0 |
| 5.0 | 0 | 0 |
| 10.0 | 0 | 0 |
| 15.0 | 3 | 8 |

*indicates batteries where the lapse of time between the completion of the electrolyte pouring to the sealing of the battery was one hour.

TABLE 3

| CHARGED AMPERE-HOUR BASED ON RATED CAPACITY BY INITIAL CHARGE (%) | RATE OF OCCURRENCE OF SHORT-CIRCUITED BATTERY USING POSITIVE ELECTRODE A** (%) | RATE OF OCCURRENCE OF SHORT-CIRCUITED BATTERY USING POSITIVE ELECTRODE B** (%) |
| --- | --- | --- |
| 1.0 | 3 | 5 |
| 3.0 | 2 | 3 |
| 5.0 | 0 | 0 |
| 10.0 | 0 | 0 |
| 20.0 | 0 | 0 |

**indicates batteries where the lapse of time between the completion of the electrolyte pouring to the sealing of the battery was one hour and the standing time between the completion of the electrolyte pouring to the start of the initial charging was 10 hours.

As seen from the results set forth in Tables 1, 2 and 3, it has been found that in manufacturing a sealed alkaline storage battery using as its positive electrode a paste nickel electrode plate containing Co and/or CoO, if the method meets three specific conditions, i.e., that the battery container is sealed within one hour from the completion of the pouring of the electrolyte, that the lapse of time from the completion of the electrolyte pouring to the start of the initial charging of the battery is within about 10 hours, and that the charged ampere-hour based on the rated capacity of the battery by the initial charging is 5% or more, a sealed alkaline storage battery can be obtained which is free from short-circuiting.

Additionally, a sealed alkaline storage battery using the paste nickel electrode containing both Co and CoO is also free from the battery short-circuiting when manufactured using the process complying with the above-described three conditions.

Thus, according to the present invention, when a sealed alkaline storage battery is manufactured using a positive paste nickel electrode paste containing Co and/or CoO and a negative electrode stacked upon the positive electrode with a separator interposed therebetween in a battery container which is sealed within about one hour after an alkaline electrolyte is poured into the battery container, and the initial charging of the battery is started within about 10 hours after the electrolyte is poured into the container, and is continued to provide the sealed battery with a charged ampere-hour of about 5% or more of its rated capacity, a sealed alkaline storage battery free from battery short-circuiting is obtained.

As will be apparent to one skilled in the art, various modifications can be made within the scope of the aforesaid description. Such modifications being within the ability of one skilled in the art form a part of the present invention and are embraced by the appended claims.

It is claimed:

1. A method of manufacturing a sealed alkaline storage battery using a positive paste nickel electrode comprising (a) assembling a battery element having a positive nickel electrode containing at least one cobalt compound selected from the group consisting of cobalt and cobalt oxide, a negative electrode plate, and a separator interposed between said positive electrode and said negative electrode; (b) inserting said battery element into a battery container; (c) pouring an alkaline electrolyte into said battery container; (d) sealing said battery container within about one hour after completion of the pouring of said alkaline electrolyte to provide a sealed storage battery; (e) starting initial charging of said storage battery within about 10 hours after completion of the pouring of said alkaline electrolyte; and (f) continuing said charging to provide said storage battery with an initial charged ampere-hour amounting to about 5% or more of said storage battery's rated capacity.

2. The method according to claim 1 wherein said positive nickel electrode contains both cobalt and cobalt oxide.

* * * * *

UNITED STATES PATENT AND TRADEMARK OFFICE
CERTIFICATE OF CORRECTION

PATENT NO. : 5,435,055
DATED : July 25, 1995
INVENTOR(S) : Jun Furukawa

It is certified that error appears in the above-indentified patent and that said Letters Patent is hereby corrected as shown below:

On the title page: Notice [*]

[*] Notice: The portion of the term of this patent subsequent to Jun. 21, 2011 has been disclaimed.

should read:

[*] Notice: The portion of the term of this patent subsequent to May 24, 2013 has been disclaimed.

Signed and Sealed this

Sixteenth Day of April, 1996

BRUCE LEHMAN

*Attest:*

*Attesting Officer*      Commissioner of Patents and Trademarks